Sept. 20, 1927.  
C. C. HANSEN  
1,643,069  
AIR LINE OILER  
Filed April 22, 1927

INVENTOR.
Charles C. Hansen
BY
HIS ATTORNEY

Patented Sept. 20, 1927.

1,643,069

UNITED STATES PATENT OFFICE.

CHARLES C. HANSEN, OF EASTON, PENNSYLVANIA, ASSIGNOR TO INGERSOLL-RAND COMPANY, OF JERSEY CITY, NEW JERSEY, A CORPORATION OF NEW JERSEY.

AIR-LINE OILER.

Application filed April 22, 1927. Serial No. 185,810.

This invention relates to oiling devices, but more particularly to an air line oiler adapted to be attached to a hose or pipe line used for conveying pressure fluid from a source of supply to machines intended to be actuated thereby, such as rock drills, motors and the like.

The objects of the invention are to insure a uniform and adequate supply of lubricant to fluid actuated machines, to prevent frequent interruptions in the operation of such machines for the purpose of supplying lubricant thereto and to enable substantially the entire supply of lubricant to be exhausted from the reservoir after each filling thereof.

Figure 1:
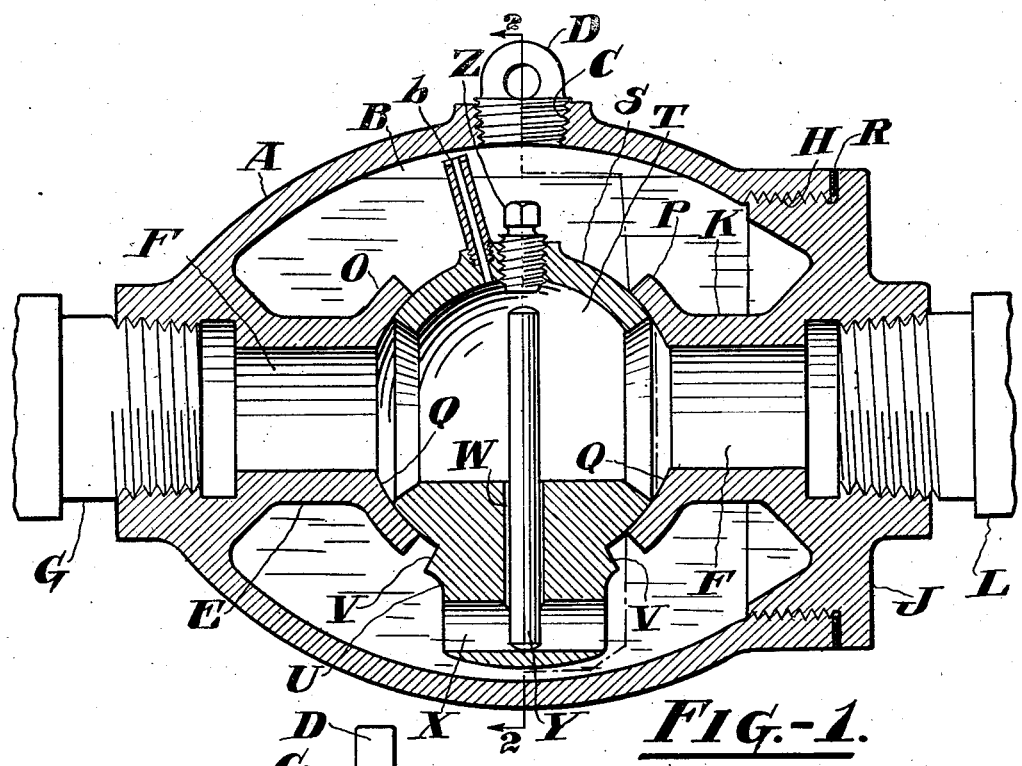
Figure 2:
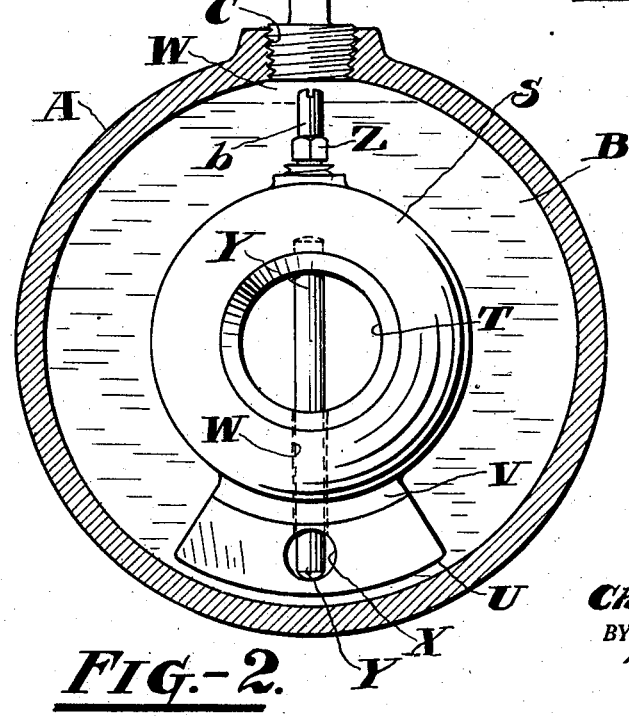

Other objects will appear hereinafter, and to all of these ends the invention consists of the combination of elements and arrangement of parts having the general mode of operation substantially as hereinafter described and claimed and illustrated in the accompanying drawings, in which Figure 1 is a longitudinal sectional elevation of an air line oiler constructed in accordance with the practice of the invention, and Figure 2 is a transverse sectional elevation taken through Figure 1 on the line 2—2 looking in the direction indicated by the arrows.

Referring to the drawings, the invention comprises a casing A, the interior B of which forms a reservoir for oil or other suitable lubricant which may be introduced into the casing through an aperture C normally sealed by a filling plug D. At one end of the casing is formed a projection E having a passageway F therethrough for the passage of pressure fluid. The outer end of the passageway F is in this instance threaded for connection with a hose or pipe G of an air line which may lead from a source of pressure fluid supply (not shown).

In the opposite side of the casing A is formed an enlarged threaded aperture H to receive a correspondingly threaded plug J which, like the casing A, is also provided with a projection K having a passageway F threaded at its outer end to cooperate with a section L of the hose line.

In accordance with the present invention, the inner ends of the projections E and K terminate in flared walls O and P respectively, and having at their inner adjacent ends spherical surfaces Q.

In order to render the plug J adjustable so that relative longitudinal movement between the spherical surfaces Q may be obtained, liners R may be disposed between the plug J and the end of the casing A. By this arrangement, whenever it is desired to move the projection K towards the projection E one or more liners R may be removed. Conversely, if it be desired to move the projection K in the opposite direction, an additional liner or liners R may be interposed between the casing and the plug J.

Between the spherical surfaces Q and supported thereby is a spherical member S having a passageway T therethrough to establish communication between the passageways F of the projections. On one side of the member S is formed a weight U of suitable proportions to prevent rotation of the spherical member S with the casing A whenever the position of the casing is being changed.

Any suitable means may be provided for preventing the member S from rocking to such a position that its passageway T may be placed in direct communication with the reservoir B. In the present instance shoulders V are formed on the member S for this purpose, said shoulders being intended to cooperate with the flared ends O and P of the projections.

The member S, in this instance, is provided with a transverse passage W which leads from the passageway T to a longitudinal passage X extending through the weight near the outermost end thereof to communicate at both ends with the reservoir B. The wall of the passage X in this instance forms a convenient seat for a pin Y disposed in the passage W to extend through the passageway T preferably to a point near the upper wall of the member S.

The pin Y in this instance is of somewhat smaller diameter than the passage W to enable an adequate supply of lubricant to pass between the pin and the wall of the passage W.

To the end that endwise movement of the pin Y may be limited, a set screw Z is disposed in the upper wall of the member S directly in line with the pin Y so that when it is desired to hold the pin against endwise movement and depend only upon transverse movement of the pin to deliver oil into the passageways, the screw Z may be turned in the direction of the pin Y to a point near, or against, the uppermost end of said pin.

In order to insure an adequate supply of pressure fluid in the reservoir to act on the surface of the oil, a tube $b$ is screwed into the member S to extend with its free end to a point near the wall of the casing A, that is, to a point above the surface of the oil.

The operation of the device is as follows: A portion of the pressure fluid such as compressed air entering the passageways from the air line will flow through the tube $b$ into the reservoir and create a pressure therein substantially equal to the pressure in the passageways. After the tool or machine to which the lubricant is being supplied is set in operation, the pressure in the air line will drop slightly below that in the reservoir so that a slight unbalancing effect is obtained between these points. This unbalanced state is maintained throughout the operation of the tool owing to the pulsations caused by the admission and cut-off of pressure fluid into the tool. The effect of these pulsations in the reservoir will be to raise the oil in the passages X and W and, owing to the vibratory movement of the pin Y, the oil will be forced out of the passage W into the passageway T from whence it will be conveyed to the tool by the pressure fluid utilized for actuating the tool.

During the operation of the oiler the pin Y may also reciprocate somewhat, and accelerate the delivery of the oil into the passageways. While such movement of the pin Y may be advantageous under some conditions, it is, however, not strongly relied upon for delivering oil into the passageways and under most operating conditions it has been found that the best results may be obtained by adjusting the screw Z so that the pin will move only in a transverse direction. This action of the pin will have the effect of squeezing the oil out of the passage W into the passageway T.

The present invention is particularly adapted for delivering lubricant to rock drills of the hand held type or other pneumatic tools used for work in which the drilling periods are of short duration, thus necessitating frequent shifting of the drill and the oiler from one portion of the work to another. When used under such conditions, and in fact under all conditions, the weight U will at all times maintain the pin Y in a vertical position and thus hold the outlet opening of the tube $b$ above the surface of the oil.

I claim:

1. An air line oiler comprising a casing forming a reservoir for oil, projections in said casing having passageways for pressure fluid, spherical surfaces at the inner ends of the projections, means rotatable on said surfaces affording communication between the passageways, means in the said means for delivering oil from the reservoir to the passageways, and a weight on the first said means for insuring communication of the second said means with the lowermost point of the reservoir, irrespective of the positions of the casing.

2. An air line oiler comprising a casing forming a reservoir for oil, projections in opposite sides of the casing having passageways for pressure fluid, spherical surfaces at the inner ends of the projections, a spherical member rotatable on the spherical surfaces, said member being hollow to afford communication between the passageways, means in said member for delivering oil from the reservoir into the passageways, and a weight on the member for preventing rotation of said member with the casing, thus holding the oil delivery means in the lowermost portion of the reservoir in all positions of the casing.

3. An air line oiler comprising a casing forming a reservoir for oil, projections in opposite sides of the casing having passageways, one of said projections being removable, spherical surfaces at the inner ends of the passageways, a spherical member engaged by and rotatable on the spherical surfaces, said member having a passageway to afford communication between the passageways in the projections, a passage in the spherical member affording communication between the reservoir and the passageways, a pin in the passage adapted to be vibrated by the pulsations in the pressure fluid for delivering oil from the passage into the passageways, and a weight carried by the member to prevent rotation of the said member with the casing, thus holding the inlet opening of the passage in the lowermost portion of the reservoir in all positions of the casing.

4. An air line oiler comprising a casing forming a reservoir for oil, projections in opposite sides of the casing having passageways, one of said projections being removable, spherical surfaces at the inner ends of the passageways, a spherical member engaged by and rotatable on the spherical surfaces, said member having a passageway to afford communication between the passageways in the projections, a passage in the spherical member affording communication between the reservoir and the passageways, a pin in the passage adapted to be vibrated by the pulsations in the pressure fluid for delivering oil from the passage into the passageways, adjustable means in the member for limiting endwise movement of the pin, and a weight carried by the member to prevent rotation of the said member with the casing, thus holding the inlet opening of the passage in the lowermost portion of the reservoir in all positions of the casing.

5. An air line oiler comprising a casing forming a reservoir for oil, projections in opposite sides of the casing having passageways, one of said projections being removable, spherical surfaces at the inner ends of the passageways, a spherical member engaged by and rotatable on the spherical surfaces, said member having a passageway to afford communication between the passageways in the projections, a passage in the spherical member affording communication between the reservoir and the passageways, a pin in the passage adapted to be vibrated by the pulsations in the pressure fluid for delivering oil from the passage into the passageways, adjustable means in the member for limiting endwise movement of the pin, a weight carried by the member to prevent rotation of the said member with the casing, thus holding the inlet opening in the lowermost portion of the reservoir in all positions of the casing, and a tube carried by the member conveying pressure fluid into the reservoir to act on the surface of the oil.

In testimony whereof I have signed this specification.

CHARLES C. HANSEN.